US009258469B2

(12) United States Patent
Chen et al.

(10) Patent No.: US 9,258,469 B2
(45) Date of Patent: Feb. 9, 2016

(54) OPTICAL DEVICE AND STABILIZING METHOD FOR OPTICAL ELEMENTS THEREOF

(71) Applicants: Sintai Optical (Shenzhen) Co., Ltd., Shenzhen, Guangdong Province (CN); Asia Optical International Ltd., Tortola (GB)

(72) Inventors: Tsung-Li Chen, Taichung (TW); Sheng-Chieh Huang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/524,051

(22) Filed: Oct. 27, 2014

(65) Prior Publication Data
US 2015/0116574 A1 Apr. 30, 2015

(30) Foreign Application Priority Data
Oct. 28, 2013 (TW) .............................. 102138877 A

(51) Int. Cl.
*H04N 5/225* (2006.01)

(52) U.S. Cl.
CPC .................................. *H04N 5/2254* (2013.01)

(58) Field of Classification Search
CPC ..... H04N 5/2254; H04N 5/2252; G02B 7/022
See application file for complete search history.

(56) References Cited

U.S. PATENT DOCUMENTS

| 8,320,064 | B2 * | 11/2012 | Musha | G02B 7/102 359/704 |
|---|---|---|---|---|
| 2006/0181783 | A1 * | 8/2006 | Masuki | H04N 5/2254 359/700 |
| 2011/0122518 | A1 * | 5/2011 | Musha | G02B 7/021 359/824 |

* cited by examiner

*Primary Examiner* — Nicholas Giles
(74) *Attorney, Agent, or Firm* — McClure, Qualey & Rodack, LLP

(57) ABSTRACT

An optical device includes a base; an image sensor disposed on the base; an outer frame connected to the base and having a flat surface; an inner frame having a protrusion and movable between a first position and a second position with respect to the base; and a lens group disposed on the inner frame and having an optical axis, wherein the protrusion abuts the flat surface and the optical axis extends through the image sensor when the inner frame moves to the first position, and the inner frame is accommodated in a space when the inner frame moves to the second position.

20 Claims, 4 Drawing Sheets

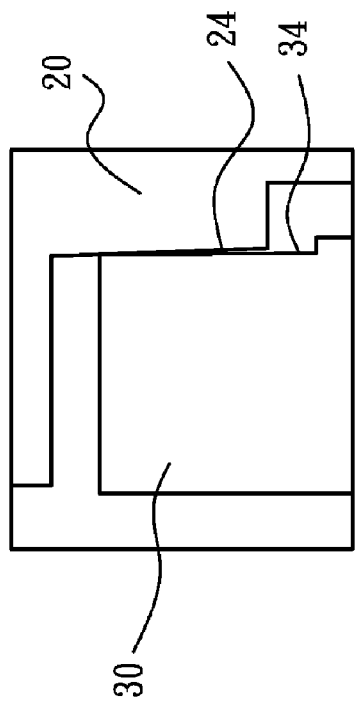
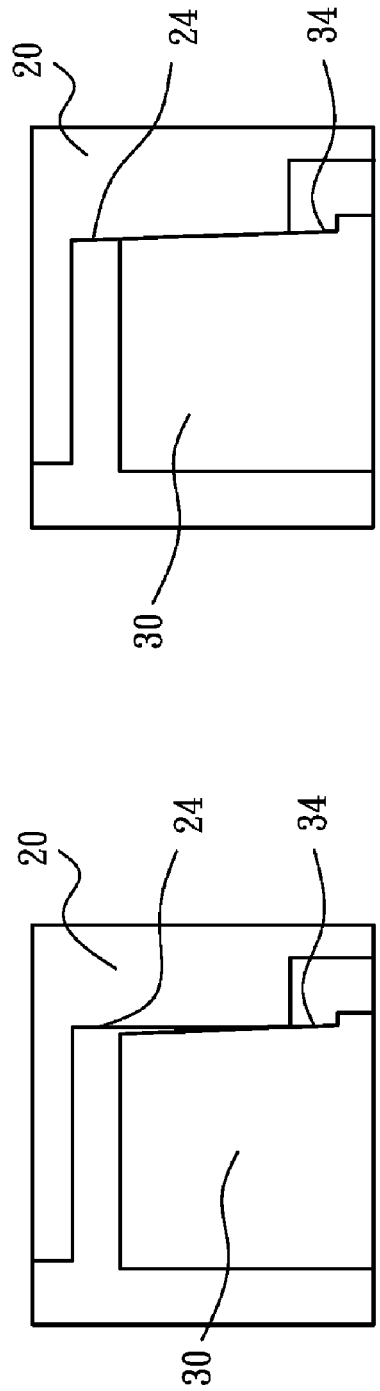

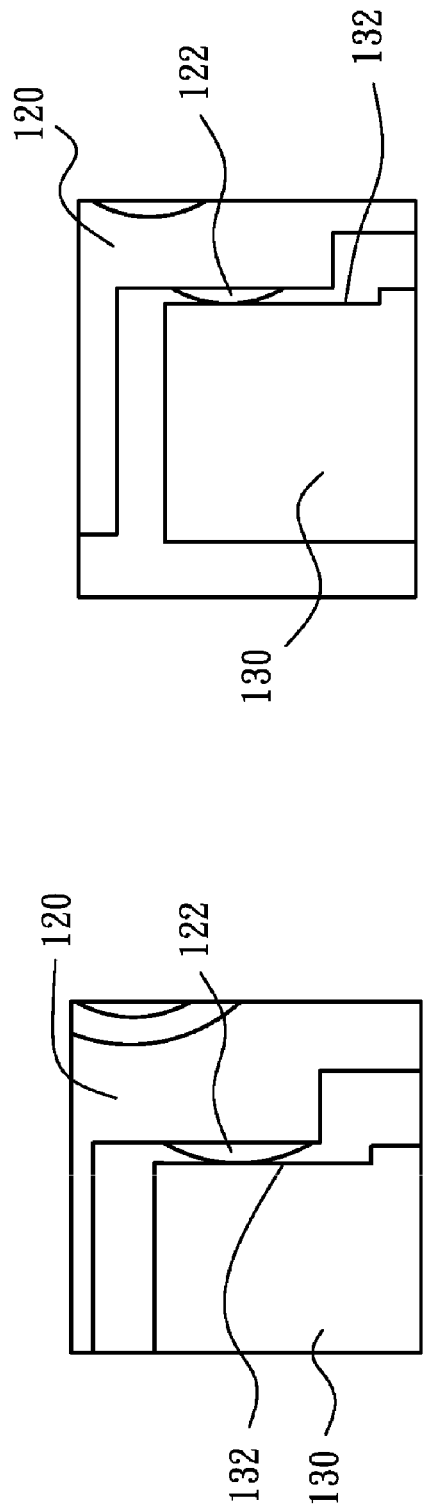
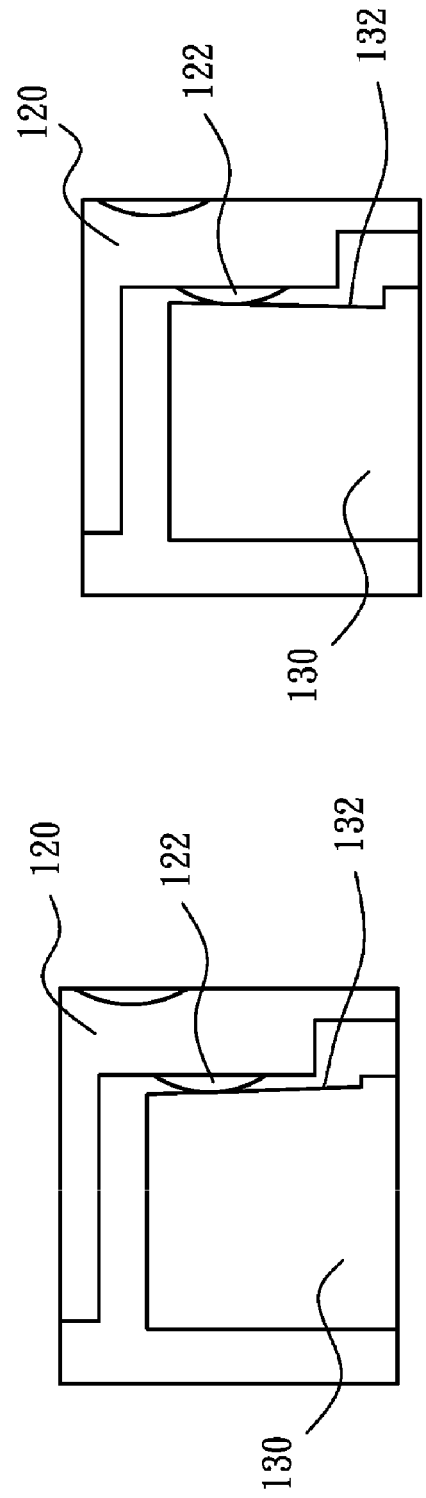

OPTICAL DEVICE AND STABILIZING METHOD FOR OPTICAL ELEMENTS THEREOF

BACKGROUND OF THE INVENTION

1. Field of the Invention

The invention relates to an optical device and a stabilizing method for optical elements thereof, and more particularly to an optical device and a stabilizing method for optical elements thereof by utilizing a protrusion to increase structural stability of elements of the optical device.

2. Description of the Related Art

When a camera is turned on, a lens may stretch out to receive light. In such a structure, lens groups are generally designed to be rotatable between a working position and a withdrawing position wherein the lens group in the working position enables an image to be formed on an image sensor. When the camera is turned off, the lens groups move to retract into the camera by overlapping with each other. As cameras are required to be lighter and slimmer, the entire structure is therefore required to be more compact. Thus, the lens groups are designed to be rotatable to have a compact structure after the lane groups overlap with each other. When the camera is turned on, the lens groups are rotated to their working position so that light can pass through the lens groups to form an image on the image sensor. When the camera is turned off, the lens groups are rotated to their withdrawing position to facilitate their accommodation. The structure of cameras is disclosed in Taiwan patent publication no. 201232027 and Taiwan patent publication no. 2013160691.

When the lens groups move from the withdrawing position to the working position, an inner frame carrying lens is positioned by abutting an outer frame so that light can pass through the lens groups to form an image on the image sensor. Referring to FIG. 1, a conventional optical lens includes a rotatable gear 10 which engages with a driving gear 22 disposed on an inner frame 20. The inner frame 20 carries a lens group (not shown) and is rotatably disposed on an outer frame 30. The rotatable gear 10 rotates to move the inner frame 20 between a working position and a withdrawing position. FIG. 1 shows the inner frame 10 in the working position. The inner frame 20 has a first positioning surface 24, and the outer frame 30 has a second positioning surface 34 corresponding to the first positioning surface 24. When the inner frame 20 moves from the withdrawing position to the working position shown in FIG. 1, the first positioning surface 24 abuts the second positioning surface 34 for positioning the inner frame 20.

Referring to FIGS. 2 to 4, as the first positioning surface 24 and the second positioning surface 34 are flat surfaces, the contact position of the first positioning surface 24 and the second positioning surface 34 depends on the shape and tolerance of the inner frame 20 and the outer frame 30, which is possibly on upper side (as shown in FIG. 2), on lower side (as shown in FIG. 3) or uncertain (as shown in FIG. 4). The uncertain contact position may cause uncertain position of the inner frame 20 when the inner frame 20 moves to the working position, which may causes unstable optical property of the optical lens.

BRIEF SUMMARY OF THE INVENTION

The invention provides an optical device. The optical device in accordance with an exemplary embodiment of the invention includes a base; an image sensor disposed on the base; an outer frame connected to the base and having a flat surface; an inner frame having a protrusion and movable between a first position and a second position with respect to the base; and a lens group disposed on the inner frame and having an optical axis, wherein the protrusion abuts the flat surface and the optical axis extends through the image sensor when the inner frame moves to the first position, and the inner frame is accommodated in a space when the inner frame moves to the second position.

The optical device in accordance with another exemplary embodiment of the invention includes a base; an image sensor disposed on the base; an outer frame connected to the base and having a protrusion; an inner frame having a flat surface and movable between a first position and a second position with respect to the base; and a lens group disposed in the inner frame and has an optical axis, wherein the protrusion abuts the flat surface and the optical axis extends through the image sensor when the inner frame is moved to the first position, and the inner frame is accommodated in a space when the inner frame moves to the second position.

In another exemplary embodiment, the protrusion is curved.

In yet another exemplary embodiment, when the inner frame is in the first position, the optical axis is perpendicular to the image sensor.

In another exemplary embodiment, the optical device is an optical lens.

The invention also provides a stabilizing method for optical elements of an optical device. The optical device includes an image sensor, an outer frame, an inner frame and a lens group, the lens group disposed in the inner frame movable between a first position and a second position, when the inner frame moves to the first position, the optical axis extends through the image sensor, and when the inner frame moves to the second position, the inner frame is accommodated in a space. The stabilizing method in accordance with an exemplary embodiment of the invention includes the following steps: forming a protrusion on the inner frame; positioning the inner frame in the first position stably by propping the protrusion against a flat surface of the outer frame when the inner frame moves to the first position; and positioning the inner frame in the second position stably by receiving the inner frame in a space when the inner frame moves to the second position.

The stabilizing method in accordance with another exemplary embodiment of the invention includes the following steps: forming a protrusion on the outer frame; positioning the inner frame in the first position stably by propping the protrusion against a flat surface of the inner frame when the inner frame moves to the first position; and positioning the inner frame in the second position stably by receiving the inner frame in a space when the inner frame moves to the second position.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 2 to 4 depict an inner frame abutting an outer frame of various shapes of an conventional optical lens;

FIG. 6 is an enlarge view of region A of FIG. 5; and

FIGS. 7 to 9 depict an inner frame abutting an outer frame of various shapes of an optical lens of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
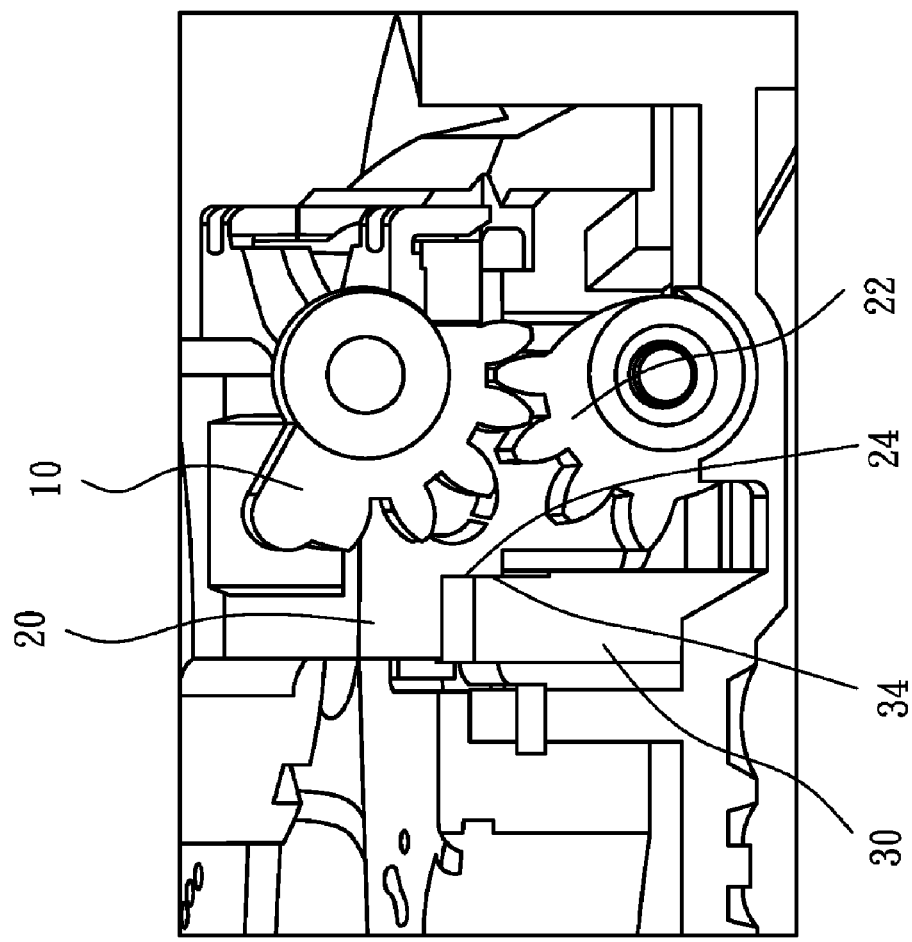
FIG. 1 depicts a cross section of a conventional optical lens.
Figure 5:
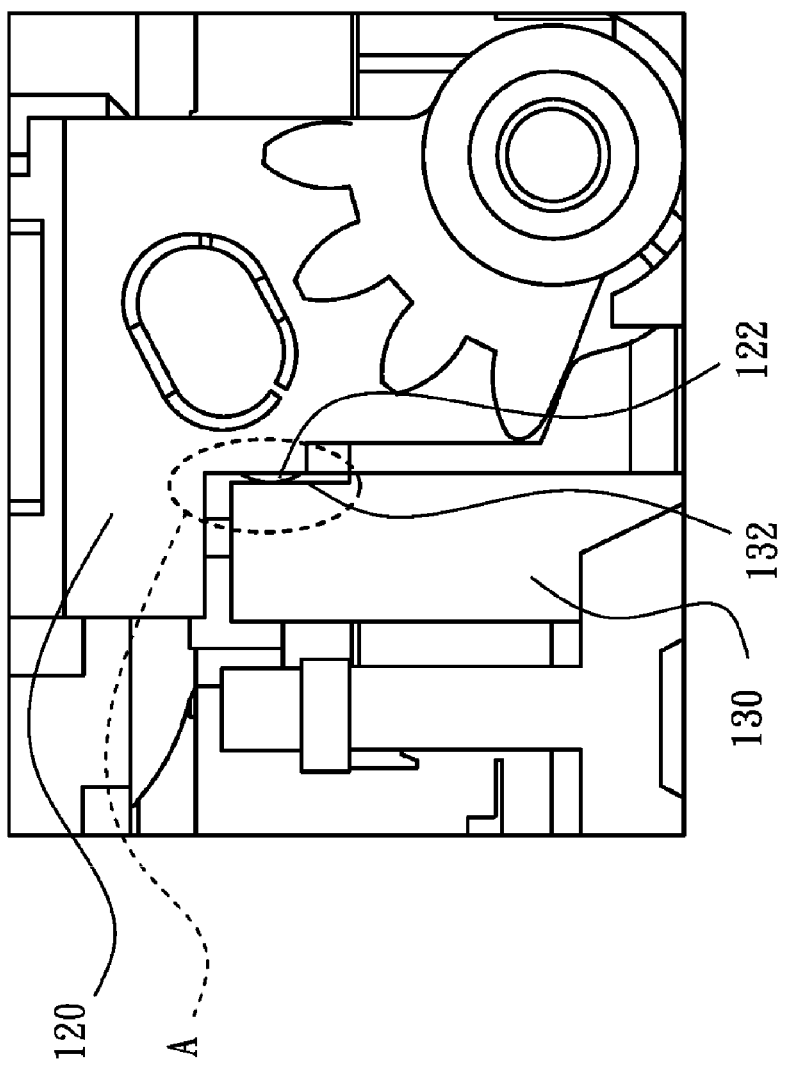
FIG. 5 is a partial cross section of an optical lens of the invention.

Referring to FIG. 5, an optical device of the invention is described by an optical lens as an exemplary embodiment. The optical lens of the invention includes a base (not shown), an image sensor (not shown), an inner frame 120, an outer frame 130 and a lens group (not shown). The image sensor is, for example, a charged couple device (CCD) which is disposed on the base. The outer frame 130 is disposed on the base. The inner frame 120 is rotatably disposed on the outer frame 130. The inner frame 120 has a protrusion 122, and the outer frame 130 has a flat surface 132. The inner frame 120 is movable between a working position (first position) and a withdrawing position (second position). The lens group is disposed on the inner frame 120. When a camera is turned on, the optical lens stretches out, and the inner frame 120 is moved by a rotatable gear from the withdrawing position to the working position. At this time, an optical axis of the lens group is perpendicular to the image sensor so that light can pass through the lens group to form an image on the image sensor. When the camera is turned off, the inner frame 120 moves to the withdrawing position and is accommodated in a space.

When the inner frame 120 moves from the withdrawing position to the working position, the protrusion 122 of the inner frame 120 is propped against a flat surface 132 of the outer frame 130, as shown in FIG. 6. Even if the outer frame is slightly deformed in shape due to varied manufacturing conditions, the inner frame 120 is still propped against the outer frame 130 by the protrusion 122. The protrusion 122 may be propped against the flat surface 132 of the outer frame 130 by its middle portion (shown in FIG. 7), lower side (shown in FIG. 8), or upper side (shown in FIG. 9), the differences between which are very limited because the protrusion 122 has a small area. Therefore, the mechanical stability of the optical lens can be effectively maintained.

Preferably, the protrusion 122 is curved. The radius and curvature of the protrusion 122 depend on design requirement and have no limits.

In another embodiment, the protrusion is disposed on a flat surface of the outer frame 130. When the inner frame 120 abuts the outer frame 130, the protrusion is propped against a flat surface of the inner frame 120.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
a base;
an image sensor disposed on the base;
an outer frame connected to the base and comprising a flat surface;
an inner frame which comprises a protrusion and is movable between a first position and a second position with respect to the base; and
a lens group disposed on the inner frame and having an optical axis, wherein the protrusion abuts the flat surface and the optical axis extends through the image sensor when the inner frame moves to the first position, and the inner frame is accommodated in a space when the inner frame moves to the second position.

2. The optical device as claimed in claim 1, wherein the protrusion is curved.

3. The optical device as claimed in claim 2, wherein when the inner frame is in the first position, the optical axis is perpendicular to the image sensor.

4. The optical device as claimed in claim 1, wherein when the inner frame is in the first position, the optical axis is perpendicular to the image sensor.

5. The optical device as claimed in claim 1, wherein the optical device is an optical lens.

6. An optical device, comprising:
a base;
an image sensor disposed on the base;
an outer frame connected to the base and comprising a protrusion;
an inner frame which comprises a flat surface and is movable between a first position and a second position with respect to the base; and
a lens group disposed in the inner frame and has an optical axis, wherein the protrusion abuts the flat surface and the optical axis extends through the image sensor when the inner frame moves to the first position, and the inner frame is accommodated in a space when the inner frame moves to the second position.

7. The optical device as claimed in claim 6, wherein the protrusion is curved.

8. The optical device as claimed in claim 7, wherein when the inner frame is in the first position, the optical axis is perpendicular to the image sensor.

9. The optical device as claimed in claim 6, wherein when the inner frame is in the first position, the optical axis is perpendicular to the image sensor.

10. The optical device as claimed in claim 6, wherein the optical device is an optical lens.

11. A stabilizing method for optical elements of an optical device, wherein the optical device comprises an image sensor, an outer frame, an inner frame and a lens group, the lens group is disposed in the inner frame movable between a first position and a second position, an optical axis extends through the image sensor when the inner frame moves to the first position, and the inner frame is accommodated in a space when the inner frame moves to the second position, the stabilizing method comprising:
forming a protrusion on the inner frame;
positioning the inner frame in the first position stably by propping the protrusion against a flat surface of the outer frame when the inner frame moves to the first position; and
positioning the inner frame in the second position stably by receiving the inner frame in a space when the inner frame moves to the second position.

12. The stabilizing method as claimed in claim 11, wherein the protrusion is curved.

13. The stabilizing method as claimed in claim 12, wherein when the inner frame is in the first position, the optical axis is perpendicular to the image sensor.

14. The stabilizing method as claimed in claim 11, wherein when the inner frame is in the first position, the optical axis is perpendicular to the image sensor.

15. The stabilizing method as claimed in claim 11, wherein the optical device is an optical lens.

16. A stabilizing method for optical elements of an optical device, wherein the optical device comprises an image sensor, an outer frame, an inner frame and a lens group, the lens group is disposed in the inner frame movable between a first position and a second position, an optical axis extends through the image sensor when the inner frame moves to the first position, and the inner frame is accommodated in a space when the inner frame moves to the second position, the stabilizing method comprising:

forming a protrusion on the outer frame;

positioning the inner frame in the first position stably by propping the protrusion against a flat surface of the inner frame when the inner frame moves to the first position; and positioning the inner frame in the second position stably by receiving the inner frame in a space when the inner frame moves to the second position.

17. The stabilizing method as claimed in claim 16, wherein the protrusion is curved.

18. The stabilizing method as claimed in claim 17, wherein when the inner frame is in the first position, the optical axis is perpendicular to the image sensor.

19. The stabilizing method as claimed in claim 16, wherein when the inner frame is in the first position, the optical axis is perpendicular to the image sensor.

20. The stabilizing method as claimed in claim 16, wherein the optical device is an optical lens.

\* \* \* \* \*